United States Patent [19]

Kajikawa et al.

[11] Patent Number: 5,058,646
[45] Date of Patent: Oct. 22, 1991

[54] PNEUMATIC SAFETY TIRE

[75] Inventors: Akira Kajikawa, Kobe; Yoshihide Kojima, Takarazuka; Hiroshi Itho, Nishinomiya, all of Japan

[73] Assignee: Sumitomo Rubber Industries, Ltd., Hyogo, Japan

[21] Appl. No.: 441,556

[22] Filed: Nov. 27, 1989

[30] Foreign Application Priority Data

Nov. 30, 1988 [JP] Japan .................................. 63-302977

[51] Int. Cl.$^5$ .............................................. B60C 17/08
[52] U.S. Cl. .................................. 152/454; 152/517; 152/549; 152/555
[58] Field of Search ............... 152/454, 516, 517, 522, 152/555, 549, 520

[56] References Cited

U.S. PATENT DOCUMENTS

| 3,954,131 | 5/1976 | Hoshino et al. | 152/555 X |
| 4,142,567 | 3/1979 | Johannsen et al. | 152/549 X |
| 4,779,658 | 10/1988 | Kawabata et al. | |

FOREIGN PATENT DOCUMENTS

| 0128852 | 12/1984 | European Pat. Off. |
| 2082073 | 12/1971 | France . |
| 2137339 | 12/1972 | France . |
| 2215331 | 8/1974 | France . |
| 57-15007 | 3/1982 | Japan . |

Primary Examiner—Michael W. Ball
Assistant Examiner—Nancy T. Krawczyk
Attorney, Agent, or Firm—Birch, Stewart, Kolasch & Birch

[57] ABSTRACT

A pneumatic safety tire in which each sidewall portion is provided with a minimum thickness at a position E between an outer edge point A and a 65% height point B both located on each side of the tire equator, where the outer edge points A are defined as the axially outer edges of a ground contacting region on the tread surface in a standard loaded state in which the tire mounted on a regular rim and inflated to a regular pressure is loaded with a regular load, and the 65% height points B are defined as the positions at 65% height of the tire section height H from the bead base in a standard unloaded state in which the tire mounted on the regular rim and inflated to the regular pressure is kept free of load, and further the thickness of each sidewall portion is gradually increased from the minimum thickness position E toward the 65% height point B.

5 Claims, 4 Drawing Sheets

PNEUMATIC SAFETY TIRE

BACKGROUND OF THE INVENTION

The present invention relates to a pneumatic safety tire capable of running safely for a relatively long distance even in such a deflated state as a puncture, while preventing a decrease in high speed durability and steering stability.

There is an increasing demand for the so-called run-flat tires that can continue to run even if deflated by puncture or other accident. Therefore, tires provided on the inside thereof with a support member, such as a solid elastic member or an inflatable structure, to form double independent air chambers have been proposed. However, such structures significantly increase the tire weight and production cost, and therefore they are not practicable.

Meanwhile, even in ordinary non-run-flat tires or conventional pneumatic tires, if the tire is deflated, it is possible to run with the tire for a while as long as it is not displaced from the rim.

In order to prevent such dislocation from the rims, for example, in Japanese Patent Publication No. 57-15007, there are proposed a tire and rim assembly in which the tire beads are provided with radially, inwardly extending toes and the rim is provided with annular grooves to receive the bead toes to prevent the dislocation of the tire beads from the rim due to puncture.

If it is possible for conventional tires to run for a distance under a deflated condition as long as the tire is not dislocated from the rim, the sidewalls of such conventional tire must be relatively thin with the hardness thereof being low. Such a tire is inferior in its load bearing capacity, and heats up while running in such a deflated state causing the tire to break up by the heat, and hence the traveling distance is significantly limited.

Therefore, on the assumption that the rim dislocation is well controlled, it has been attempted to increase the thickness of the sidewalls for less strain, while using a relatively hard rubber with a low heat-generation property.

However, by merely increasing the thickness of hard rubber sidewall, while the run-flat performance may be slightly improved, tire performances in normal running, in particular, high speed durability, steering stability, and ride comfort, are sacrificed because of the resultant increase in the bending stiffness of the sidewall and heat generation. Thus, an increase in the sidewall thickness brings about contradictory effects on the run-flat performance and normal running performance.

SUMMARY OF THE INVENTION

It is therefore, an object of the present invention to provide a safety tire, in which by optimizing a change of the overall thickness of the sidewall, the run-flat performance is improved so as to be able to run a relatively long distance at a relatively high speed in a deflated condition with upgraded safety and without practically lowering the usual running performance in normal or non-deflated condition, such as high speed durability.

According to one aspect of the present invention, a pneumatic safety tire is provided which comprises:
a pair of bead portions with a bead core;
sidewalls extending radially outward one from each bead portion;
a tread portion extending between the sidewall portions;
a toroidal carcass extending through the tread and sidewall portions and turned up at both edges around the bead cores;
tread and sidewalls disposed outward of the carcass;
a belt disposed between the carcass and the tread and having cords laid at a relatively small angle relative to the equator of the tire; and
a sidewall reinforcing layer disposed inward of the carcass in each sidewall portion,
each sidewall portion being provided with a minimum thickness at a position E between an outer edge point A and a 65% height point B both located on each side of the tire equator,
the thickness of each sidewall gradually increasing from the minimum thickness position E toward the 65% height point B, wherein
the outer edge points A being defined as the axially outer edges of a ground contacting region on the tread surface in a standard loaded state in which the tire mounted on a regular rim and inflated to a regular pressure is loaded with a regular load, and
the 65% height points B being defined as the positions at 65% height of the tire section height H from the bead base in a standard unloaded state in which the tire mounted on the regular rim and inflated to the regular pressure is maintained free of load.

When running under a standard loaded state, the portions between the outer edge point A and the 65% height point B are most subjected to bending deformation. Therefore, by setting the minimum thickness point E in this range, the tire is provided with a flexibility, the reduction in the steering performance is prevented, the heat generation in this portion is reduced, and a decline in the high speed durability performance can be suppressed. As the result, the run-flat performance, which is a contradictory condition for high speed durability performance and steering performance can be improved.

In addition, the sidewall thickness is increased gradually from the minimum thickness point E to the 65% height point B. As a result, local thickness fluctuations are decreased, and thereby the generation of stress concentration is suppressed. Also by the gradual increase in the sidewall thickness, absorption of impact or reaction when running over protuberances can be improved, which contributes to an improvement in the envelope performance.

Thus the present invention can enhance the run-flat performance and prevents the lowering of the tire performances by defining the distribution of the sidewall thickness within a special range.

BRIEF DESCRIPTION OF THE DRAWINGS

An embodiment of the present invention will now be described in details with reference to the drawings, in which.

DETAILED DESCRIPTION OF THE INVENTION

Figure 1:
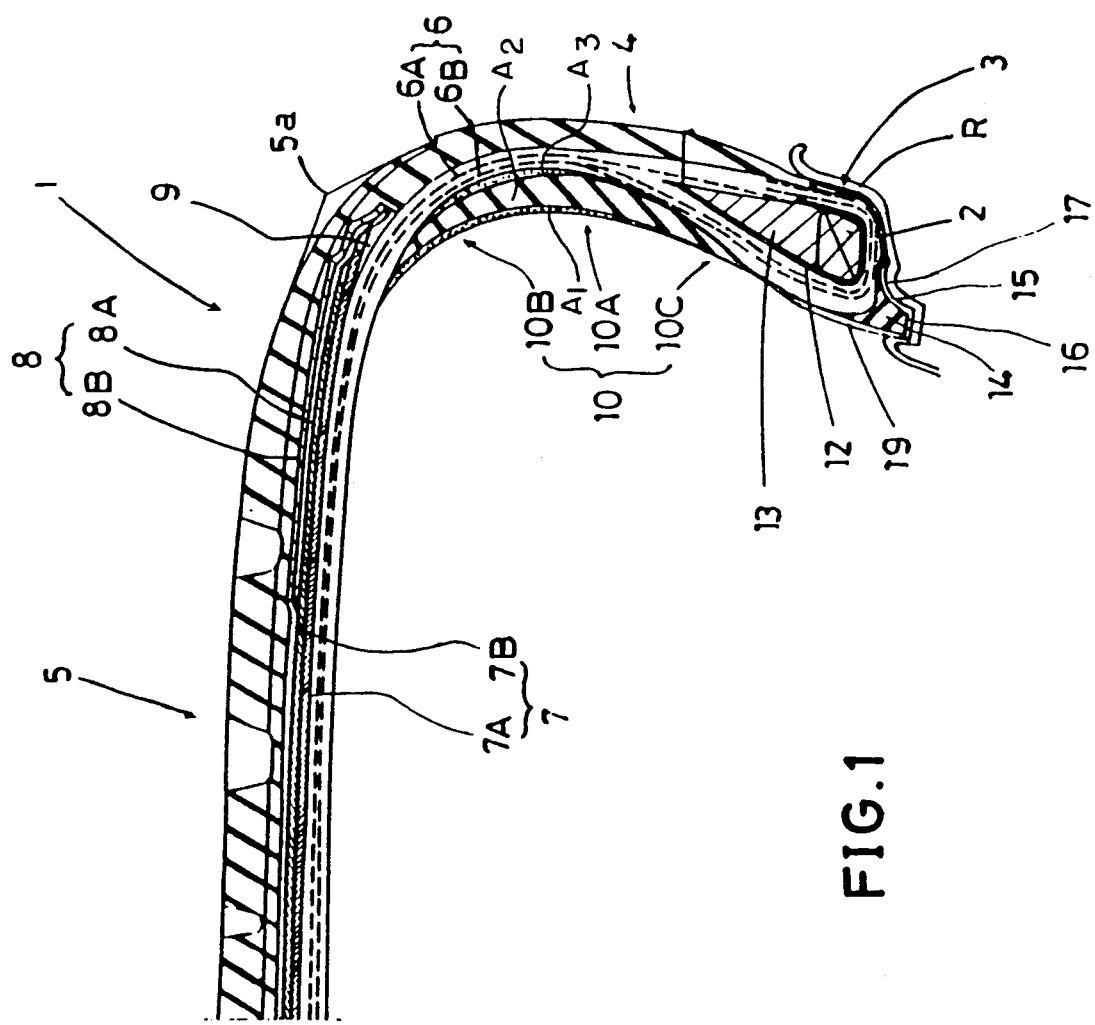
FIG. 1 is a sectional view showing an embodiment of the present invention.

In the Figures, the safety tire 1 is formed as a 255/40 ZR 17 tire.

The tire 1 has bead portions 3 provided with a bead core 2, a sidewall portion 4 extending radially outward from each bead portion 3, and a tread portion 5 extending between the upper ends of the sidewall portions to have a toroidal shape.

The tire comprises a carcass 6 having a main portion extending between the bead portions through the sidewall portions and the tread portion, a belt 7 disposed radially outside the carcass in the tread portion, and a sidewall reinforcing layer 10 of approximately crescent shape disposed inside the carcass in each sidewall portion. In this embodiment, the tire 1 was designed for high speed passenger cars, and the aspect ratio thereof, that is, the ratio H/W of the tire sectional height H to the tire width W is not more than 50%.

The carcass 6 is turned up around the bead cores from the axially inside to the outside thereof to form turned up portions. The carcass has two plies 6A, 6B of cords arranged radially at an angle of 60 to 90 degrees to the equator of the tire, and steel cords as well as organic fiber cords such as rayon, polyester, nylon, aromatic polyamide, and the like can be used for the carcass cords.

The belt 7 disposed in the tread portion is composed of an axially inner wide ply 7A and an outer narrow ply 7B, which consist of parallel cords arranged at a relatively small angle with respect to the equator of the tire so that the plies cross each other. As the belt cords, steel cords or high modulus organic fiber cords such as aromatic polyamide can be preferably used, but low modulus cords such as nylon, polyester or rayon may be used together therewith. When organic cords having a relatively smaller modulus are used, it may allow the belt to follow up deformation of the carcass 6 while maintaining the hoop effect. Further, a breaker cushion 9 made of soft rubber is disposed between each edge of the belt and the carcass.

Further, on the radially outer surface of the belt 7, bands 8 are disposed. The bands 8 consists of an outside band 8B and a pair of inside bands 8A.

Each of the inside bands 8A is extended axially inwardly from a position axially outward of each of the axially outer edges of the belt 7, and terminated while leaving, between the axially inner edges of the inside bands, a space having about ½ width of the tread width.

The outside band 8B extends all over the width of the tread 5 to cover the belt 7 and the edges are substantially aligned with the axially outer edges of the inside bands.

Both the bands 8A, 8B are made of organic fiber cords such as rayon, nylon, polyester and the like so as to mitigate the shearing strain acting between the belt 7 and the rubber tread when the tire is deformed, thereby preventing separation failure around the belt edge portion.

As mentioned above, in each of the sidewall portions 4, a sidewall reinforcing layer 10 is disposed inside the carcass.

Figure 4:
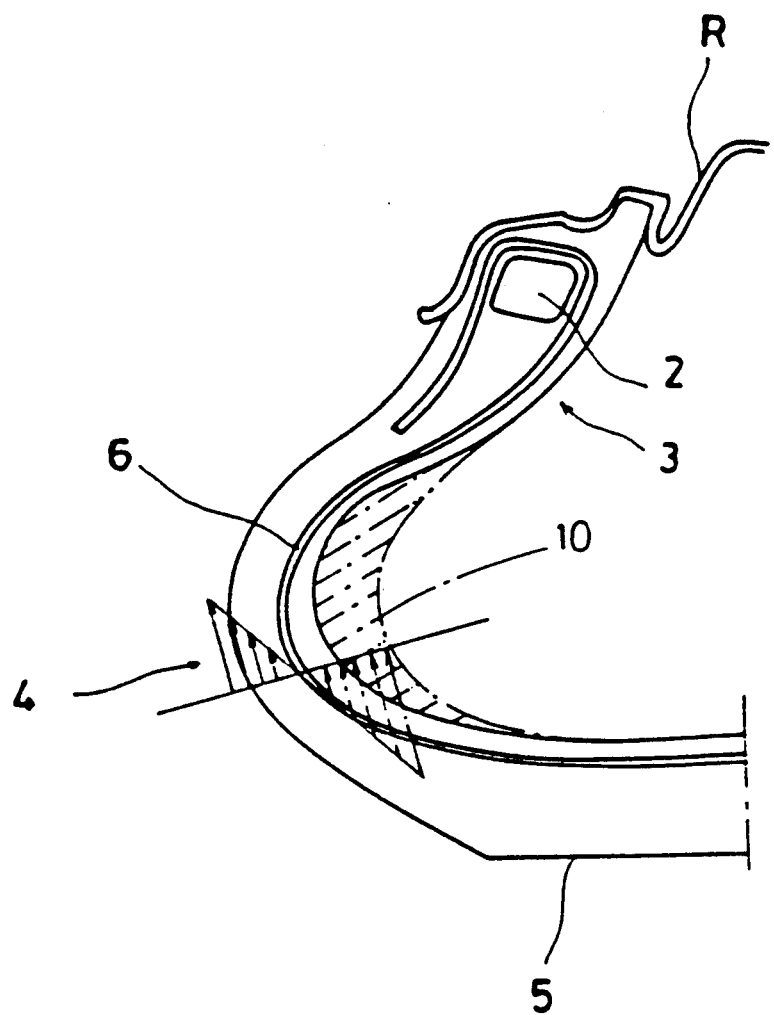
FIG. 4 is a sectional view showing the deformation of the sidwall.

As the carcass cord has a tensile rigidity more than 10 times the rigidity of the sidewall rubber, if the sidewall portions are deformed in a deflated state by a load as shown in FIG. 4, the bent part is subjected to both tensile strain and compressive strain on the axially outer side and inner side of the neutral carcass cords, respectively. Such compressive strain is burdened by the sidewall reinforcing layer 10 of a relatively hard material so as to enable 14 to run, even when deflated.

For this purpose, the thickness of the sidewall reinforcing layer 10 becomes maximum in the middle portion 10A which receives a large compressive strain when deflated, and in the radially outward portion 10B and inward portion 10C the thickness is decreased radially outward and inward, respectively, so that the sectional shape of the sidewall reinforcing layer adopts a crescent shape, thereby preventing a decline in the tire characteristics due to increase in the weight.

The sidewall reinforcing layer 10 in this embodiment has a three-layered structure where the axially inside layer A1 and the outside layer A3 are formed thinner than the intermediate layer A2, and the inside and outside layers are made of a relatively soft rubber having a Shore A hardness of 50 to 70 degrees and a 100% modulus of 10 to 30 kgf/cm$^2$, and the intermediate layer is made of a relatively hard rubber having a Shore A hardness of 70 to 90 degrees and a 100% modulus of 30 to 70 kgf/cm$^2$. As a result, the inside layer made of a soft rubber can alleviate the local compressive strain caused on the inner surface of the intermediate layer when running under a deflated condition, and the cracks can be prevented thereby enhancing the breakdown resistance. Although maximum bending and compressive strains act on this inside layer A1, its breakdown can be prevented due to the use of a soft rubber which is excellent in crack resistance. The outside layer disposed between the carcass and the intermediate layer can lessen the reduction in riding comfort due to the use of the hard rubber intermediate layer, and it is also effective for relaxing the shearing strain occurring between them, so that breakage of the intermediate layer due to the generated heat can be prevented.

In the present invention, the point resides in the optimum distribution of the overall thickness of the sidewall portions, inclusive of the above-mentioned carcass, rubber sidewalls and sidewall reinforcing layers.

Figure 2:
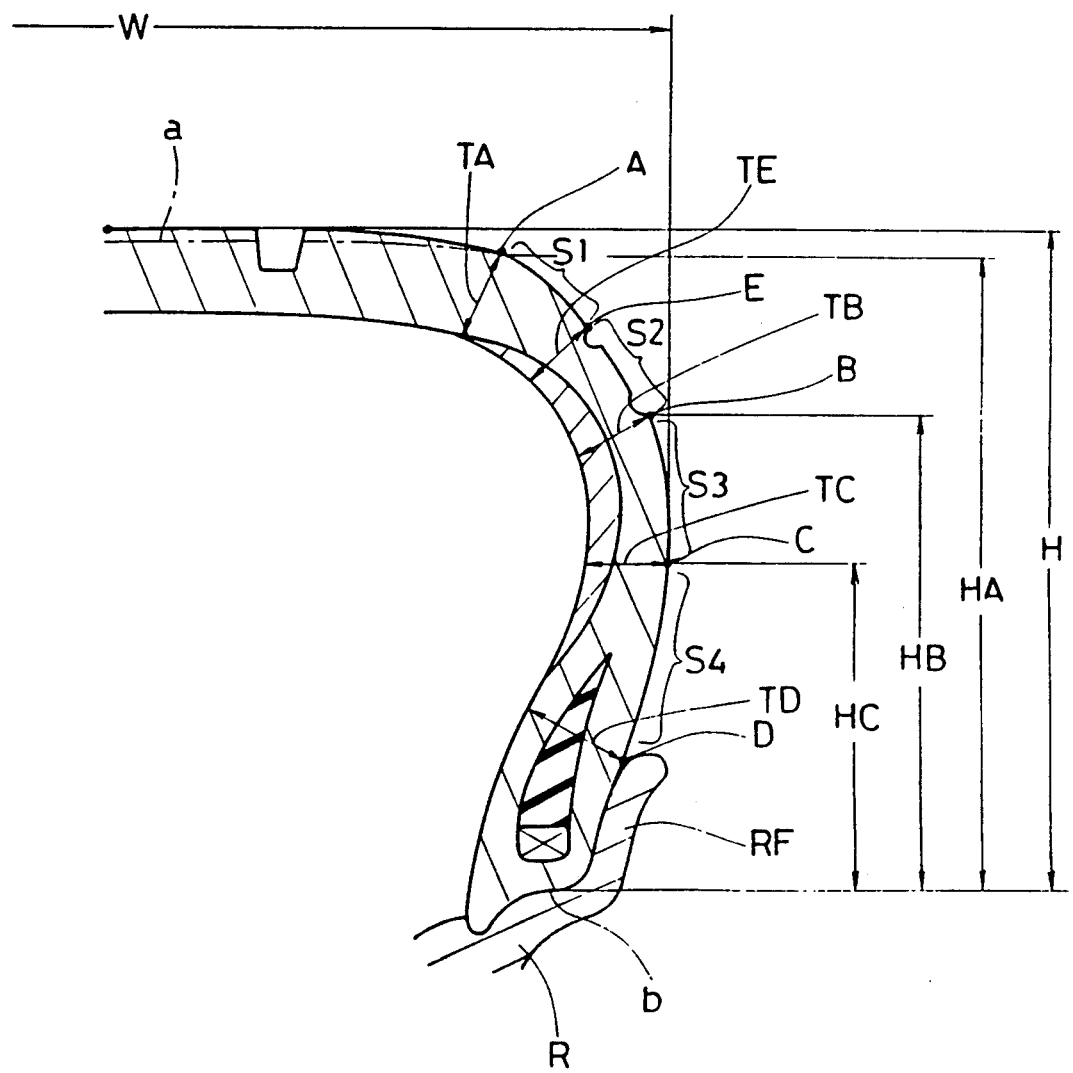
FIG. 2 is a schematic sectional view thereof.

Accordingly, as shown in FIG. 2, each sidewall portion has a minimum thickness at a position E between an outer edge point A and a 65% height point B both located on each of the sidewall portions, wherein the outer edge points A are defined as the axially outer edges of a ground contacting region (a) on the tread surface in a standard loaded state in which the tire mounted on a regular rim R and inflated to a regular pressure is loaded with a regular load, and the 65% height points B are defined as the positions at 65% height HB of the tire section height H from the bead base b in a standard unloaded state in which the tire mounted on the regular rim and inflated to the regular pressure is kept free of load (HB=0.65 H).

More specifically, the region defined between the outer edge point A and the 65% height point B (hereinafter referred to as first region) does not contact with the ground in normal running, and this region is located near the ground contacting surface (a), therefore it is desired to decrease the thickness to lower the heat generation in order to enhance the high speed durability performance. Such arrangement also leads to a decrease in the vertical stiffness, thereby improving ride comfort and a steering performance. Accordingly, the minimum thickness position E should be formed between the outer edge point A and the 65% height point B. Further, the first region contacts with the road surface when running in a deflated state, and therefore from this viewpoint, too, it is evident that the increase of thickness of the first region does not contribute to the enhancement in the run-flat performance.

Furthermore, in the pneumatic safety tire 1, the overall thickness is gradually increased in the region S2 from the minimum thickness position E to the 65% height point B. As a result, by avoiding an abrupt change in the sidewall thickness, stress concentration is prevented, with a gradual increase in the vertical stiffness toward the 65% height point B, whereby the run-flat performance and the impact absorbing performance in normal running are improved.

The height HA at the outer edge point A is generally between 82 to 98% of the sectional height H.

The difference between the thickness TA at the outer edge point A and the thickness TB at the 65% height point B is set to be not more than 5% of the maximum tire section width W formed between the maximum width points C in the above-explained standard unloaded state. More preferably it is set within 3.5% of the maximum width W, whereby a desirable overall thickness distribution is obtained. Meanwhile, the thickness TA may be set either larger or smaller than the 65% height point thickness TB, within the above range.

The minimum thickness TE is set to be about 65 to 85% of the thickness TB at the 65% height point.

Furthermore, in the tire of the above-mentioned size of this embodiment, the difference (TB−TE) of the 65% height point thickness TB and the minimum thickness TE is set in a range of 2.0 to 5.0 mm, and the minimum thickness TE is not less than 10 mm and not more than 13 mm.

If the difference (TB−TE) is less than 2.0 mm, the minimum thickness TE becomes excessive or the 65% height point thickness TB becomes too small. If exceeding 5 mm, the reverse effects are caused, and it is known that any desirable thickness distribution is not obtained in either case. Besides, if the minimum thickness TE is less than 10 mm, the load bearing capacity of the tire drops, and if exceeding 13 mm, the generation of heat in the area increases, and the durability may be sacrificed.

In addition in a third region S3 from the 65% height point B to the maximum width point C in the standard unloaded state, the sidewall thickness is gradually increased from the point B to the point C because the deformation of the sidewall portions when deflated is largest in the vicinity of the maximum width point C. As a result, the deformation is restrained, and the run-flat performance is enhanced.

Furthermore, the thickness TC at the maximum width point C is set to be not less than 4.5% and not more than 9% of the tire maximum width W. This is the range for withstanding the bending stress, neither excessively nor insufficiently, during run-flat traveling.

In a fourth region S4 from the maximum width point C to a point D at which the bead portion starts to contact with a rim flange RF of the regular rim R, the thickness is increased from the former to the later.

The thickness TD at the contact point D is set to be not less than 5% and not more than 10% of the tire maximum width W.

Furthermore, in the tire of the tire size of 255/40 ZR 17, the difference (TD−TC) in thickness between the contact point D and the maximum width point C is not less than 2.0 mm and not more than 5.0 mm.

In the portion around the upper edge of the rim flange RF, a large bending deformation is likely to occur when running in a flat condition, and accordingly the heat generation is increased, and damages such as ply separation are likely to occur, thereby tending to spoil the run-flat performance. Accordingly, in order to prevent damage of the bead portion, the thickness TD at the contact point D is increased as mentioned above, whereby the run-flat performance can be enhanced.

In addition, in the tire 1, between each of the bead core 2 and the carcass 6, a bead reinforcing layer 12 is disposed to prevent abrasion of the bead core due to movement of the carcass 6 accompanying the deformation of the tire, and further, above the bead core 2, a bead apex 13 extending taperingly radially outward is disposed between the carcass main portion and each of the turned up portions and inside the bead reinforcing layer 12, so as to increase the rigidity of the bead 3.

Those bead apexes help to keep the deformed shape of a portion from the sidewall to the bead in a specified standard curved shape. For this purpose, the bead apex 9 is made of a relatively hard rubber having a Shore A hardness of 74° to 95°.

Each of the bead portions 3 is further provided in the axially innermost portion with a toe strip made of hard rubber to form a bead toe 14 which projects radially inward from the bead base line L. The bead base is provided with a convex hump groove 15 located immediately axially outside the toe 14. Besides, a rim chafer preventing a chafer of the bead portion by the rim R is disposed to extend from the axially inside of the bead portion toward the axially outside along the profile of the bead toe and the hump groove. On the other hand, the rim R is provided with annular grooves 16 into which the bead toes are fitted and humps 17 which are fitted into the hump grooves 15. By the engagement therebetween, the bead portions are set on the rim R safely preventing the tire from being dislocated from the rim when deflated. Incidentally, such a toe and a hump groove may be disposed at either both or one of the beads 3.

The following Examples are given by way of illustration of the present invention and should not be considered in any way as being limiting.

Test tires of 255/40 ZR 17 size were experimentally fabricated according to the specification given in Table 1 and the structure shown in FIG. 1.

In Working Example 1, the thickness TC at the maximum width point C was 5.7% of the maximum width W of the tire, and the thickness was gradually increased from the minimum thickness point E to the contact point D. In Working Example 2, the thickness was almost uniform from the 65% height point B to the maximum width point C. The thickness was gradually increased from the maximum width point C to the contact point D.

By contrast, in Reference 1, the maximum thickness portion was formed between the outer edge point A of the ground contacting region S and the 65% height point B. In Reference 2, the thickness distribution was similar to Reference 1, but the thickness was reduced as compared with Reference 1. In Reference 3, the thickness distribution was further decreased.

Figure 3:
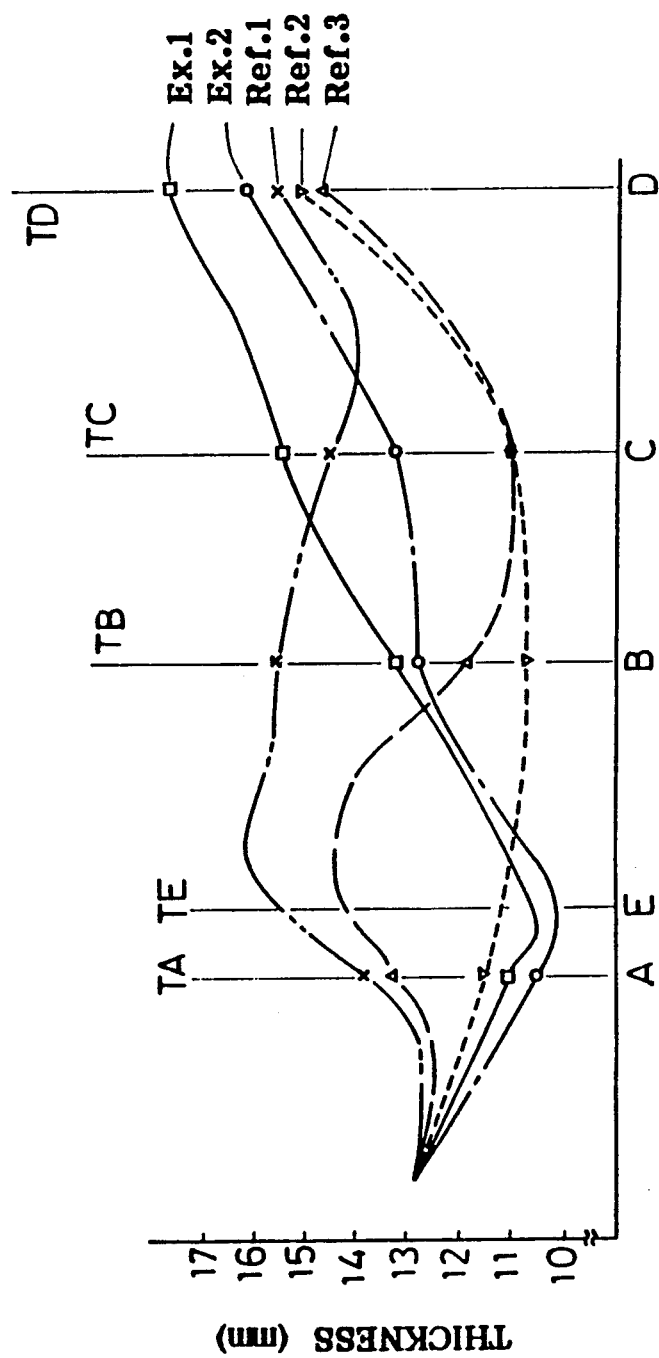
FIG. 3 is a diagram showing the thickness distributions of working examples of the present invention and reference examples.

Those thickness distributions of the test tires are summed up in FIG. 3.

Each test tire was mounted on a rim R having the structure shown in FIG. 1. The rim width is 10 inches. Such assemblies were mounted on four wheels of a 5000 cc automobile, which was run at 100 km/h with only one wheel inflated to zero pressure to simulate a puncture state, and then the distance until such deflated tire was broken was measured. The results are shown in Table 1. As apparent from Table 1, the run-flat performance was largely improved.

Furthermore, these tires were tested of high speed durability performance by using an indoor drum tester. Setting the internal pressure at 3.2 kg/cm$^2$, the load at 525 kg, the camber angle at 1° and the rim size at 10×17, the rotating speed was increased from 250 km/h at 10 km/h intervals every 20 minutes. The speed at which a breakdown was occured, and the time (minutes) to reach the breakdown at that speed are shown in Table 1, from which it is known that the tires of Examples 1 and 2 were both excellent in the high speed durability. On the contrary, Reference 1 having the maximum thickness between the outer edge point A and the 65% height point B was inferior in the high speed durability.

Moreover, running an actual car on a circuit course, the tires were examined whether the steering performance was lowered, the results of which are shown in Table 1 by using an index based on the assumption that Reference 3 is 100. The larger the index, the better is the result.

As apparent from the test results, the tires of Examples 1 and 2 maintain an excellent sterring performance same as in the conventional tire, in spite of their superior run-flat performance.

As described above, in the pneumatic safety tires according to the present invention, as the distribution of the sidewall thickness inclusive of the sidewall reinforcing layer thickness, is optimized while providing a minimum thickness position between each of the outer edge point A of the ground contacting region on the tread surface and the 65% height point B, the run-flat performance can be remarkably improved without sacrificing the high speed durability performance and the steering performance.

TABLE 1

| | Ex. 1 | Ex. 2 | Ref. 1 | Ref. 2 | Ref. 3 |
|---|---|---|---|---|---|
| Thickness | | | | | |
| TA (mm) | 11.0 | 10.5 | 13.8 | 13.6 | 11.5 |
| TB (mm) | 13.2 | 12.8 | 15.5 | 11.8 | 10.8 |
| TC (mm) | 15.5 | 13.3 | 14.5 | 11.0 | 11.0 |
| TD (mm) | 17.6 | 16.2 | 15.7 | 14.7 | 15.3 |
| TE (mm) | 10 | 9.8 | 17.0 | 14.5 | 12.5 |
| Running distance (km) | 98 | 85 | 67 | 33 | 21 |
| High speed durability | 330 km/h 9 min. | 350 km/h 5 min. | 290 km/h 6 min. | 320 km/h 18 min. | 330 km/h 15 min. |
| Streeing stability | 99 | 101 | 91 | 97 | 100 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

It is claimed:
1. A pneumatic safety tire comprising:
a pair of bead portions with a bead core;
sidewall portions extending radially outward one from each of said bead portions;
a tread portion extending between the sidewall portions, said portions disposed outward of the carcass;
a toroidal carcass extending through the tread and sidewall portions and turned up at the both edges around the bead cores;
a belt disposed between the carcass and the tread and having cords laid at a relatively small angle relative to the equator of the tire; and
a sidewall reinforcing layer disposed inward of the carcass in each sidewall portion,
each sidewall portion provided with a minimum thickness at a position (E) between an outer edge point (A) and a 65% height point (B) both located on each side of the tire equator,
the thickness of each sidewall gradually increased from the minimum thickness position (E) toward the 65% height point (B), wherein
the outer edge points (A) are defined as the axially outer edges of a ground contacting region on the tread surface in a standard loaded state in which the tire mounted on a normal rim and inflated to a normal pressure is loaded with a regular load, and
the 65% height points (B) are defined as the positions at 65% height of the tire section height (H) from the bead base in a standard unloaded state in which the tire mounted on the regular rim and inflated to said normal pressure is maintained free of load,
the difference between the thickness (TB) at the 65% height point and the minimum thickness (TE) being in the range of 2.0 to 5.0 mm,
each sidewall portion gradually increasing in thickness from the 65% height point (B) toward the maximum width position (C) where the axial section width of the tire is maximum in the standard unloaded state,
each sidewall portion gradually increasing in thickness from the maximum width position (C) toward a contact position (D) where the bead portion contacts with a flange of the rim,
the thickness (TD) at the contact position (D) being larger than the thickness (TC) at the maximum width position (C),
the difference between the thickness (TD) at the contacting position (D) and the thickness (TC) at the maximum width position (C) being in the range of 2.0 to 5.0 mm
the sidewall reinforcing layer is a cresent-shaped three-layered structure in which a hard rubber strip having a Shore A hardness of 70 to 90 and a 100% modulus of 30 to 70 kgf/cm$^2$ is sandwiched between soft rubber strips each having a Shore A hardness of 50 to 70 and a 100% modulus of 10 to 30 kgf/cm$^2$.

2. The pneumatic safety tire according to claim 1, wherein each of said bead portions is provided between the main portion and turned up portion of the carcass with a bead apex made of hard rubber having a Shore A hardness of 74 to 95.

3. The pneumatic safety tire according to claim 1, wherein each of said bead portions is provided between the main portion and turned up portion of the carcass with a bead apex made of hard rubber having a Shore A hardness of 74 to 95.

4. The tire according to claim 1, wherein each of said bead portions is provided is provided in its axially innermost portion with a toe made of hard rubber and projecting radially inwardly from the bead base.

5. The tire according to claim 1, wherein each of said bead portions is provided in its axially innermost portion with a toe made of hard rubber and projecting radially inwardly from the bead base, and further each bead portion is provided in the bead base with a circumferentially extending groove which is located axially outward of said bead toe.

* * * * *